United States Patent [19]

Katz

[11] Patent Number: 5,298,572

[45] Date of Patent: * Mar. 29, 1994

[54] MOISTURE CURABLE POLYMERS

[75] Inventor: Lawrence E. Katz, Orange, Conn.

[73] Assignee: Olin Corporation, Cheshire, Conn.

[*] Notice: The portion of the term of this patent subsequent to Jul. 13, 2010 has been disclaimed.

[21] Appl. No.: 43,124

[22] Filed: Apr. 5, 1993

Related U.S. Application Data

[63] Continuation-in-part of Ser. No. 935,318, Aug. 26, 1992, Pat. No. 5,227,434.

[51] Int. Cl.$^5$ ............................................. C08L 75/04
[52] U.S. Cl. .................................. 525/419; 525/453; 525/455; 525/460; 528/49; 528/272
[58] Field of Search .............. 525/419, 453, 455, 460; 528/49, 272

[56] References Cited

U.S. PATENT DOCUMENTS

| | | | |
|---|---|---|---|
| 3,408,321 | 10/1968 | Ashby | 260/37 |
| 3,592,795 | 7/1971 | Ashby | 260/46.5 |
| 3,632,557 | 1/1972 | Brode et al. | 260/77.5 TB |
| 3,923,870 | 12/1975 | Singer | 260/482 C |
| 3,941,849 | 3/1976 | Herold | 260/607 A |
| 3,971,751 | 7/1976 | Isayama et al. | 260/37 R |
| 4,242,490 | 12/1980 | Emerson et al. | 528/77 |
| 4,335,188 | 6/1982 | Igi et al. | 428/458 |
| 4,472,560 | 9/1984 | Kuyper et al. | 526/120 |
| 4,477,589 | 10/1984 | van der Hulst et al. | 502/169 |
| 4,507,469 | 3/1985 | Mita et al. | 528/425 |
| 5,099,075 | 3/1992 | Katz et al. | 568/621 |

FOREIGN PATENT DOCUMENTS 397036 8/1990 European Pat. Off. .
496109 2/1991 European Pat. Off. .

OTHER PUBLICATIONS

Article entitled "Modified Polyether Sealants Pass Durability Milestone", Adhesives Age, May 1992.

*Primary Examiner*—Maurice J. Welsh
*Attorney, Agent, or Firm*—Dale L. Carlson

[57] ABSTRACT

This invention relates to a process for producing a moisture curable silyl-terminated polymer which comprises the steps of: (a) reacting a terminally-unsaturated monol (preferably a polyether or polyester monol) with a polyfunctional hydroxyl-reactive compound selected from the group consisting of polyisocyanates and organic polacyl compounds in a molar ratio of one mole of monol for each equivalent of functionality on said polyfunctional hydroxyl-reactive moiety, to provide a terminally-unsaturated polymer having terminal unsaturation at each end thereof; and (b) reacting said terminally-unsaturated polymer with a dialkoxyalkylsilane to form a dialkoxyalkylsilylterminated polymer capable of curing upon contact with moisture.

25 Claims, No Drawings

MOISTURE CURABLE POLYMERS

This application is a continuation-in-part application of U.S. Ser. No. 07/935,318, filed Aug. 26, 1992, now U.S. Pat. No. 5,227,434.

FIELD OF THE INVENTION

This invention relates generally to moisture curable polymers and, more specifically, to silyl-terminated polymers and intermediates for the production thereof.

BACKGROUND OF THE INVENTION

Various types of moisture curable sealant materials are known in the art. A particularly useful material is a polysiloxane having silicon end groups provided with one or more hydrolyzable groups. This polymer vulcanizes rapidly by contact with atmospheric moisture without producing undesirable phenomena such as bubbling caused by generation of gaseous reaction products. Moreover, the adhesive property and the thermal stability of this polymer are excellent. However, since such a polymer has a polysiloxane backbone, its cost is higher than might be desired. Accordingly, efforts have been made recently to develop lower cost polymers having hydrocarbon backbones and having silicon atoms with a hydrolyzable end group only at each end of the molecule.

One such lower cost polymer is disclosed in U.S. Pat. No. 3,971,751. This patent discloses a polyether compound having a silyl-ether terminal group at each end of the molecule. The polymer of the '751 patent is made by polymerizing an alkylene oxide in the presence of an alcohol, such as propylene glycol or ethylene glycol. However, since caustic was used to catalyze the polymerization reaction, the molecular weight of the diol is limited to about 3,000, and above this molecular weight the functionality decreases significantly, as does the physical properties of the cured polymer product. Therefore, in order to obtain the necessary physical properties these diols were coupled with a dihalo-organic compound in order to increase the molecular weight of the diol. Unfortunately, oligomerization reactions tend to occur in the presence of the dihalo-organic compound, and the degree of polymerization and the molecular weight distribution (or so-called "polydispersity") of the resulting polymer is quite broad. This high polydispersity polyol is then converted to a polymer having terminal unsaturation at each end by reaction of the polyol with a compound such as allyl chloride. Overall, the process of this '751 process is cumbersome and costly. Accordingly, new processes for producing polymers characterized by lower polydispersity values would be highly desired by the sealants and adhesives community.

As another illustration, European Patent Publication 397,036 discloses the preparation of an unsaturated group-terminated polyalkylene oxide by subjecting a monoepoxide having at least 3 carbon atoms to a ring-opening addition polymerization using an initiator in the presence of a double metal cyanide complex catalyst, followed by converting the terminal hydroxyl groups of the resulting hydroxyl group-terminated polyalkylene oxide to unsaturated groups by an end-capping procedure. Example 1 of this European Patent Application discloses the polymerization of propylene oxide using an allyl alcohol initiator in the presence of a zinc hexacyano cobaltate (DMC) catalyst to produce a "monol" (a mono-alcohol), followed by reaction with allyl chloride to covert the terminal hydroxyl group on the monol to an unsaturated group, followed by an addition reaction with methyldimethoxysilane to provide a polyalkylene oxide terminated at each end with a hydrolyzable silane group.

European Patent Publication 496,109 A2 discloses a process for producing alkoxysilane-terminated polyethers by coupling together two allyl-started monols each having a molecular weight of from 1,500 to 10,000 using a coupling reactant selected from the group consisting of halogenated methanes, aliphatic isocyanates, aromatic isocyanates and carbonates, followed by hydrosilation of the coupled polyether.

New processes and compositions for providing inexpensive alternatives to the use of polysiloxanes and/or allyl-started monols for the production of moisture curable sealants characterized by excellent elongation properties would be highly desired by the sealants and adhesives manufacturing community.

SUMMARY OF THE INVENTION

In one aspect, the present invention relates to a process for producing a moisture curable silyl-terminated polymer which comprises the steps of:

(a) reacting a terminally-unsaturated monol (preferably a polyether or polyester monol, with the proviso that when said polyfunctional hydroxyl-reactive compound is a polyisocyanate and the monol is a polyether monol, then the polyether monol is other than an allyl-started monol) with a polyfunctional hydroxyl-reactive compound selected from the group consisting of polyisocyanates and organic polyacyl compounds in a molar ratio of about one mole of monol for each equivalent of functionality on said polyfunctional hydroxyl-reactive compound, to provide a terminally-unsaturated polymer having terminal unsaturation at each end thereof; and (b) reacting said terminally-unsaturated polymer with a dialkoxyalkylsilane to form a dialkoxyalkylsilyl-terminated polymer capable of curing upon contact with moisture.

In another aspect, the present invention relates to the terminally-unsaturated polymer of step (a) above.

In another aspect, the present invention relates to a silyl-terminated polymer selected from the group consisting of polyethers and polyesters bound together by a polyfunctional hydroxyl-reactive compound selected from the group consisting of polyisocyanates and organic polyacyl compounds, said polymer being made by reacting a monol with said polyfunctional hydroxyl-reactive compound in a molar ratio of about one mole of monol for each equivalent of functionality on said polyfunctional hydroxyl-reactive compound, with the proviso that when said polyfunctional hydroxyl-reactive compound is a polyisocyanate then said monol is other than an allyl-started polyether.

In yet another aspect, the present invention relates to a filled polymer comprising a filler and the above-described silyl-terminated polymer.

In yet another aspect, the present invention relates to a rubbery material obtained by moisture curing (using water or other polyhydric compound) the aforementioned silyl-terminated filled or unfilled polymer.

These and other aspects will become apparent upon reading of the following detailed description of the invention.

DETAILED DESCRIPTION OF THE INVENTION

The monol employed in the present invention preferably has a weight average molecular weight of between about 400 and about 30,000, more preferably between 1,000 and 12,000, most preferably between 2,500 and 10,000. If very soft moisture curable polymers are desired, the molecular weight of the monol is desirably between 11,000 and 30,000, more preferably between 11,000 and 20,000. Preferred monol reactants for use in the present invention are polyether monols and polyester monols. The polyethers can be prepared, according to well-known methods, by condensing an alkylene oxide, or a mixture of alkylene oxides using random or step-wise addition, with a hydric initiator or mixture of initiators. Illustrative alkylene oxides include ethylene oxide, propylene oxide, butylene oxide, amylene oxide, hexylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The hydric initiator used in preparing the polyether monol reactant can be any of a wide variety of such initiators, but is preferably selected from the following and combinations thereof: allyl alcohol, 2-allylphenol, 3-butenyl alcohol, 2-allyl-6-methylphenol, cinamyl alcohol, undecylenyl alcohol, allylamines, acrylic acids, undecylenic acid, and the like. Illustrative of the flexibility of this process is the ability to use hydric initiators containing more than one terminal double bond, for example diallyamine, trimethylolpropane diallylether, trimethylolethane diallylether, diallyl carbinol, diallylethyl carbinol, diallylpropyl carbinol, triallyl carbinol, 2-diallylamino ethanol, 1,3-diallyloxy-2-propanol, diallylmethylcarbinol, diallylacetic acid and N-methyl-N-allyl ethanolamine. In accordance with the process of the present invention, each of these initiators yields monols terminated by two or more double bonds; these provide a means for crosslinking.

The hydric initiators used in preparing the polyether monol may be unsaturated secondary amines;

$HRNCH_2CH=CH_2$ (where R=alkyl, aryl, cycloalkyl, a terminally unsaturated olefin moiety). These basic secondary amines react with alkylene oxides to give polyether monols. If the molecular weight of these is low; a catalyst such as double metal cyanide, may be employed to further increase the molecular weight to a desired level. The hydric initiators used in preparing the polyether monol may be unsaturated acids; $CH_2=CH-(CH_2)_nCO_2H$ (where n=1–30). These unsaturated carboxylic acids may be reacted with alkylene oxides using a double metal cyanide catalyst.

The alkylene oxide-hydric initiator condensation reaction is preferably carried out in the presence of a double metal cyanide catalyst. However, other standard methods may be used: caustic catalysts, Lewis acid catalysts, metal porphyrin catalysts, etc. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. Using double metal cyanide catalysis, a purer monol having any desired molecular weight may be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849; 4,242,490 and 4,335,188 to The General Tire & Rubber Company. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or CR(III) or FE(II) or Fe(III); x, y, and z may be fractional numbers, integers, or zero and vary depending on the exact method of preparation of the complex.

Monols made by the DMC catalysts process may be used as is or treated to remove catalyst residues (see U.S. Pat. No. 5,099,075).

Polyester monols may be made using conventional polyester synthesis. For example, as an illustration of the polyesterification reaction, the polymerization of caprolactone in the presence of an alcohol (such as allyl alcohol) may be used, as illustrated for analogous reactions by U.S. Pat. No. 2,990,379. Polyesterification catalysts are any of the well-known acids, bases or transition metal compounds, such as for example, para-toluene sulfonic acid, titanium alkoxides, tin carboxylates, organic amines, combinations thereof, and the like. Polycaprolactone polyester monols may be made using aluminum alkoxyalkyl catalysts, or zinc alkoxyalkyl catalysts, as is known in the art. These catalysts can be used to make monols with terminal groups such as $-(CH_3)$ $CH=CH_2$, $-(CH_2)_2$ $NR_2$, $CO_2R$ where R is an organic radical having terminal unsaturation. Polylactide monols, and monol copolymers of caprolactone/lactide may be made using aluminum alkoxyalkyl catalysts. Analogously, polyester monols, where $R=-R'CHCH=CH_2$ ($R'=H$ or alkyl group) can be made.

In a preferred aspect of the present invention, a polyisocyanate is employed as the coupling agent to bind the molecules of monol together. Any suitable organic polyisocyanate, or mixture of polyisocyanates, may be used. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), xylene diisocyanate (XDI), isophorone diisocyanate (IPDI), 3,3'-bistoluene-4,4'-diisocyanate, hexamethylene diisocyanate (HDI), hydrogenated MDI, hydrogenated XDI, and modified liquid MDI adducts, oligomeric HDI (e.g. dimer, trimer, etc.), oligomeric IPDI (e.g. dimer, trimer, etc.), naphthalene-1,5-diisocyanate, other oligomeric isocyanates, the polymeric isocyanates such as polyphenylene polymethylene isocyanate (PMDI), mixtures and derivatives thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI.

The process of the present invention employs a clean coupling reaction that avoids the undesirable oligomerization reactions that frequently occur using prior art methodology. In the coupling reaction, it may be desired to employ a slight molar excess of the polyisocyanate in order to assure consumption of all available hydroxyl functionality. This excess isocyanate will moisture cure, or may be allowed to react with an amine or alcohol, preferably an unsaturated amine or alcohol (e.g. allyl alcohol, allyl amine, diallyl amine, and the like).

In another preferred aspect of the present invention a polyacyl compound is employed as the coupling agent to bind the molecules of monol together. Any suitable organic polyacyl compound, or mixture of organic polyacyl compounds may be used. Illustrative are diacids, anhydrides, diacylhalides, and diesters. These include, but are not limited to: adipoyl chloride, terphthaloyl chloride, phthalic anhydride, terphthalic acid, isophthalic acid, succinyl chloride, dimethyl adipate, dimethyl terphthalate, dimethyl sebacate, and isophthaloyl chloride, or higher functionality polyacyl compounds such as trimethyl-1,3,5-benzenetricarboxylate, 1,3,5-benzene tricarboxyl trichloride, hemimellitic acid, trimellitic acid, trimellitic anhydride, trimesic acid, pyromellitic acid, pyromellitic dianhydride, and the like.

Coupling monols with a polyacyl compound is typically carried out at elevated temperature preferably between about 80° and 200° C., more preferably between about 100° and 180° C. A catalyst is usually employed, useful catalysts include the well known esterification catalysts, such as caustic, bases, transition metal compounds, acids, and miscellaneous catalysts. For example, sodium hydroxide, potassium hydroxide, other alkali metal hydroxides, alkaline earth metal hydroxides, alkali metal alkoxides, alkaline earth metal alkoxides, titanium alkoxides, tin carboxylates, organic amines, para-toluene sulfonic acid, mineral acids. The choice of catalyst will depend on the nature of the polyacyl compound. In the case of polyester-linkers the forementioned catalysts are all useful. For polyacylhalides, the basic catalysts are preferred. Similarly, for polyacids or polyanhydrides, the basic catalysts are preferred. The coupling catalysts, if used, is employed in a catalytically effective amount preferably between about 0.001% and about 10%.

Coupling monols with a polyisocyanate is typically carried out at elevated temperature, preferably between about 50° C. and about 160° C., more preferably between about 80° C. and about 140° C. A catalyst may optionally be employed in the coupling reaction. Useful catalysts include the well-known tin and amine catalysts, such as dibutyltin dilaurate, stannous octoate, DABCO amine catalyst, and the like. The coupling catalyst, if used, is employed in a catalytically effective amount, preferably between about 0.001% and about 1%.

Illustrative of the flexibility of the process of the present invention is the use of coupling agents with more than two hydroxyl-reactive groups. This yields polyethers (or polyesters) with three or more branches, and provides a means for crosslinking. When these branched polyethers (or polyesters) are used, alone, or in combination with polyethers (or polyesters) coupled with diisocyanates (or diacyl compounds), beneficial property improvement for the cured polymer is suitably attained.

The coupled terminally-unsaturated polymer can be utilized with other curable polymers, or preferably converted to curable silyl-terminated polymers. The terminally-unsaturated polymer may be vulcanized, alone or in combination with other reactive polymers, to obtain desired physical properties. Alternatively, the terminally-unsaturated polymer may be converted into another terminally-reactive polymer, for example by epoxidation of the olefinic end groups. Reaction of the terminally-unsaturated coupled polyether (or polyester) with an alkyldialkoxysilane or the like, catalyzed by platinum complexes, produces the desired silyl-terminated polymer. This silyl-terminated polymer may be easily moisture cured or cured using other polyhydric components (e.g. polyamines, polyalcohols, and the like). The rubbery properties of the fully cured materials make them especially suited for use in sealants, potting compounds, elastomers, coatings and adhesives (alone or in combination with stronger more brittle adhesives, such as epoxy resins and phenol resins).

The moisture curable components may be mixed with the usual compounding ingredients, e.g. plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the elastomer in an amount of between 0 and about 75 weight percent based upon the weight of the elastomer. The curing catalyst may be mixed in the filled formulation, or alternatively mixed in a separate component. The single component mixture has the advantage of convenience, however, anhydrous conditions are required for it to have useful shelf life. The two component system requires mixing of the two components at the time of application (or close to that time).

The moisture curable polymer, filled or neat, may be cured by addition of standard catalysts. Catalysts may be added in 0.01–5.0% (by weight, based on moisture curable polymer) to facilitate curing. Illustrative catalysts include, but are not limited to, metal salts of carboxylic acids such as titanium alkoxides, organic silicon titanates, tin octoate, dibutyltin dilaurate; amines and amine salts such as dodecylamine and dibutylamine-2-ethylhexanoate; and acidic and basic catalysts.

Curing of a two component filled system is generally more rapid since moisture can be incorporated into either or both of the components, thereby promoting rapid cure rates. Cure rate will vary with temperature, humidity, and thickness of the moisture curable polymer layer, although cure times of between about one hour and about 24 hours may be desired for certain applications.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

SPECIFIC EXAMPLES

A. Preparation of High Molecular Weight Monol Using A Double Metal Cyanide Catalyst 1. Allyl alcohol, 80.0 g (1.38 mole) containing 0.8% potassium allylate, was added to a one liter autoclave, and it was flushed with nitrogen three times. The mixture was heated at 114° C., and propylene oxide (30.0 g) added; reaction was evidenced by a drop in pressure. Propylene oxide (408.0 g) was slowly fed into the reactor at a rate to maintain the pressure below 65 psi, and reaction was continued until the pressure stopped dropping. The propoxylated allyl alcohol, 485.4 g was treated with Magnesol to remove excess base. The product had a molecular weight of 409 (hydroxyl number was 137).

2. The propoxylated allyl alcohol, 413.0 g (1.0 mole) was added to a two gallon autoclave, 0.7 g zinc hexacyanocobaltate added, and the mixture flushed three times with nitrogen. Propylene oxide (100.0 g) was added, and it reacted as evidenced by a drop in pressure. Propylene oxide (2,622.0 g) was fed into the reactor at a rate to maintain the pressure below 20 psi. At this point 1,316.0 g of the monol was removed and 1,337.0 g more propylene oxide was fed into the reactor as above. The final product had a molecular weight of 4,902 (hydroxyl number was 11.5). The intermediate monol (1,316.0 g) had a molecular weight of 2,856 (hydroxyl number was 19.7).

3. Undecylenyl alcohol, 68.1 g (0.40 mole), was added to a one liter autoclave, 0.2 g zinc hexacyanocobaltate was added, and the mixture flushed three times with nitrogen. Propylene oxide (40.0 g) was added, and it reacted as evidenced by a drop in pressure. Propylene oxide (541.0 g) was fed into the reactor at a rate to maintain the pressure below 20 psi. At this point 382.2 g of the monol was removed and 327.4 g more propylene oxide was fed into the reactor as above. Then 370.2 g of monol was removed and 229.9 g more propylene oxide was fed into the reactor as above. The final product had a molecular weight of 4,422 (hydroxyl number was 12.7). The intermediate monols had a molecular weights of 1,568 (hydroxyl number was 35.7) and 2,942 (hydroxyl number was 19.1) respectively.

B. Preparation of "Urethane-Linked" Polyether

1. Two moles of polyether monol was allowed to react with one mole of diisocyanate under nitrogen, with or without a catalyst. Reaction was tracked by gas chromatography and FTIR. Reactions were run until the isocyanate absorption (in the IR) was minimized (as was the hydroxyl absorption). e.g. to 606.6 g (0.10 mole) monol was added 12.8 g (0.05 mole) MDI and reaction carried out at 114° C. The coupling, followed by monitoring the isocyanate infrared absorption, was complete after 26.5 hours. The linked polyether had a molecular weight of 12,901 (GPC). (See Tables I and II for all illustrative examples).

In cases where it was desirable to remove any excess isocyanate, remaining after coupling, the reaction mixture was heated with the calculated amount of allyl alcohol for an hour and any excess allyl alcohol was removed by distillation.

2. To 132.1 g (0.03 mole) monol (derived from undecylenyl alcohol) was added 2.6 g (0.015 mole) TDI (80/20) and reaction carried out at 100° C. The coupling, followed by monitoring the isocyanate infrared absorption, was complete after 24 hours. The linked polyether had a molecular weight of 8,539 (GPC).

3. To 132.1 g (0.03 mole) monol (derived from undecylenyl alcohol) was added 0.023 g dibutyltindilaurate (DBTDL), 2.5 g (0.015 mole) HDI, and reaction carried out at 100° C. The coupling, followed by monitoring the isocyanate infrared absorption, was complete after 24 hours. The linked polyether had a molecular weight of 8,694.

C. Preparation of Moisture Curable Polyether

Several of the telechelic polyethers were reacted with dimethoxymethylsilane, using chloroplatinic acid as catalyst, to yield moisture curable polyethers, e.g. to the "urethane-linked" polyether from step B were added 12.2 g (0.11 mole) dimethoxymethylsilane (91% assay) and 11.3 g of a chloroplatinic acid solution (0.075% in THF). Reaction was carried out at 86° C. for 24 hours, volatiles stripped under vacuum (1.0 Mm), to yield 597.0 g of colorless viscous liquid.

D. Procedure for Curing Polyether

To 100.0 grams of moisture curable polyether as prepared in step C was added 2.0 grams dibutyltindilaurate (DBTDL) and 0.5 grams laurylamine. After mixing, and heating at 700° C., the polyether was poured into a 6"×8¼" Teflon frame (fastened to a glass plate). The plate was placed in a room at 20° C. and 50% relative humidity for at least two weeks. At this time, the polymer was removed and physical properties measured using standard ASTM methods (using an "Instron"). Table III shows the physical property data obtained for cured, unfilled, polyethers, as well as comparative data on commercial Silmod ® polyethers. The physical properties of the urethane-linked polyethers depend on the molecular weight of the polyether, and are superior to those of commercially available Silmod ® polyethers.

E. Preparation of Filled Sealants

To facilitate comparison with commercially available sealants, the formulation recommended for Silmod ® was employed (See Formulation I). Table IV shows the data obtained for cured, filled sealants. The physical properties depend on the molecular weight of the polyether. The tensile strength of urethane-linked polyether filled sealants is superior to that of Silmod ® filled sealants. Curing of these filled sealants was done following a procedure analogous to that of step D above.

| Formulation I Ingredients | Filled Sealant Formulation Phr |
|---|---|
| Fillers: | |
| Calcium Carbonate | 120.0 |
| Titanium Dioxide | 20.0 |
| Polyether: | 100.0 |
| Plasticizer: Dioctyl Phthalate | 50.0 |
| Thixotropic Agent: | 3.0 |
| Antioxidant: | 1.0 |
| UV Absorber: | 1.0 |
| Dhydrating Agent: | 2.0 |
| Adhesion Promoter | 3.0 |
| Hardening Catalyst: DBTDL | 2.0 |
| Catalyst Promoter: Lauryl amine | 0.5 |
| Total: | 302.5 | cl F. Preparation of "Ester-Linked" Polyether

1. Two moles of polyether monol were allowed to react with one mole of diester, under nitrogen, with a catalyst. Reaction was tracked by FTIR, and run until the hydroxyl absorption was minimized. e.g. to 102.7 g of a polyether monol (0.10 mole) was added 9.7 g (1.05 mole) dimethylterphthalate and 0.05 g titanium tetrabutoxide. The stirred reaction mixture was heated 2 hours at 120° C., 15.5 hours at 150° C., and 24 hours at 180° C. The coupling was followed by monitoring the hydroxyl infrared absorption. A yield of 108.7 g linked polyether, that had a molecular weight of 2,047 (GPC), was isolated.

2. Two moles of polyether monol were allowed to react with one mole of diacylchloride, under nitrogen. Reaction was tracked by FTIR, and run until the hydroxyl absorption was minimized e.g. to 102.7 g (0.10 mole) monol was added 9.5 g (0.05 mole) adipoyl chloride, and the reaction mixture heated at 145° C. for 1.5 hours. This was heated at 120° C. for 21 hours, 0.6 g (0.003 mole) adipoyl chloride added, and reaction run 3.5 hours longer. This was treated with Magnesol (1%), Celite (0.5%), and carbon (1%). Filtration yielded 100.0 g of linked polyether that had a molecular weight of 2,498 (GPC).

TABLE I

URETHANE-LINKED POLYETHER MADE FROM UNSATURATED MONOL** PREPARED WITH KOH CATALYSTS

| # | DIISO CYANATE | CATALYST (DBTDL) | TIME hrs | GPC(polyol stds.) $M_n$ | UNSATURATION@ $M_n$ |
|---|---|---|---|---|---|
| | Starting monol | — | — | 1506 | 1505 |
| 1 | TDI | — | 21 | 3354 | 3523 |
| 2 | TDI* | — | 24 | 3254 | 3600 |
| 3 | HDI | .050 | 24.3 | 3652 | 3450 |
| 4 | MDI | — | 20.6 | 3453 | 3600 |
| 5 | IPDI | .095 | 26.8 | — | 3523 |
| 6 | HMDI | .11 | 90.8 | 3751 | 3580 |

*.90 index, all others .95 index
**A Polypropyleneoxide/polyethyleneoxide monol (35%/65%) made from allyl alcohol with KOH catalyst
@Unsaturation was determined by titration with bromine and this number was used to calculate the molecular weight (Mn).

Abbreviations:
TDI = toluene diisocyanate
MDI = diphenylmethane-4,4'-diisocyanate
HMDI = dicyclohexylmethane-4,4'-diisocyanate
HDI = 1,6-hexane diisocyanate
IPDI = 1-isocyanato-3-isocyanatomethyl-3,5,5-trimethyl-cyclohexane
GPC = gel permeation chromatography
DBTDL = dibutyltindilaurate

TABLE II

URETHANE-LINKED EXTENDED POLYTHER
Prepared using unsaturated monols made in accordance with Step A

| # | Monol ($M_n$) | Temp (C.) | Time hrs | Diisocyanate | Unsaturation $M_n$ | G.P.C. $M_n$ |
|---|---|---|---|---|---|---|
| 1 | 3952 | 96 | 26 | TDI | | |
| | | 130 | 5 | | 6211 | 6107 |
| 2 | 3952 | 127 | 21 | TDI | 5976 | 5365 |
| 3 | 3672* | 100 | 54 | TDI | | |
| (added allyl alc) | | 100 | 3 | | 6757 | 6546 |
| 4 | 3672* | 100 | 23 | MDI | | |
| (added allyl alc) | | 100 | 3 | | 7491 | 8603 |
| 5 | 3952 | 90 | 22 | MDI | | |
| (added allyl alc) | | 90 | 3.5 | | 8163 | 7969 |
| 6 | 7061 | 100 | 47 | MDI | 15625 | 13066 |
| 7 | 7061 | 120 | 5 | TDI | 10282 | 14099 |
| | | 100 | 65 | | | |
| (added alyl alc) | | 100 | 3.5 | | | |
| 8 | 6745 | 114 | 1 | MDI | 19231 | 16271 |
| | | 114 | 18 | | | |
| (added T-9) | | 100 | 4.4 | | | |
| 9 | 2856 | 100 | 37 | MDI | 6944 | 5927 |
| 10 | 4905 | 114 | 37 | MDI | 10899 | 9880 |
| 11 | 6065 | 113 | 26.5 | MDI | 12048 | 12901 |

*Monol treated to remove Co and Zn.
T-9 = Stannous octoate

TABLE III

PHYSICAL PROPERTIES OF UNFILLED MOISTURE CURED SILICONE-MODIFIED POLYETHERS

| # | Coupled PolyPO $M_n$ (Diiso) | Shore A | Ten. Mod. 100% | Ult. Tens. psi | Elongation % |
|---|---|---|---|---|---|
| 1 | 3672 (TDI) | 24 | 40 | 80 | 238 |
| 2 | 3952 (MDI) | 28 | 46 | 79 | 210 |
| 3 | 7061 (MDI) | 13 | 18 | 59 | 443 |
| 4 | 7061 (TDI) | 18 | 22 | 71 | 425 |

Commercially Available Moisture Curable Sealant Material* (Comparative Data)

| | | | | | |
|---|---|---|---|---|---|
| UC | Silmod 20A/300 | 17 | 30 | 40 | 155 |
| UC | Silmod 20A | 12 | 20 | 35 | 233 |
| UC | Silmod 300 | 22 | 47 | 58 | 137 |

*J. F. Timberlake, Adhesives Age, February 1990, 26.

TABLE IV

Filled Sealants From Urethane-Linked Polyethers**

| # Polyether | Molecular Weight | Shore A Hardness | Tensile 100% | 200% | 300% | Ultimate | Elongation % |
|---|---|---|---|---|---|---|---|
| 1 | 5856 | 39 | 129 | 202 | | 226 | 247 |
| 1* | | 36 | 89 | 169 | 206 | 222 | 315 |
| 2 | 9124 | 31 | 67 | 134 | 170 | 245 | 515 |
| 2* | | 28 | 52 | 104 | 144 | 257 | 607 |
| 3 | 12797 | 32 | 72 | 138 | 174 | 282 | 610 |

TABLE IVa

Filled Sealants From Mixtures of Urethane Linked Polyethers**

| Polyether Mixture | Ratio (%/%) | Shore A Hardness | Tensile 100% | 200% | 300% | Ultimate | Elongation % |
|---|---|---|---|---|---|---|---|
| (1/2) | 60/40 | 34 | 100 | 190 | 226 | 227 | 300 |
| (1/3)* | 60/40 | 33 | 73 | 136 | 174 | 234 | 440 |
| (1/3)* | 40/60 | 30 | 59 | 123 | 154 | 236 | 523 |
| (2/3) | 60/40 | 29 | 82 | 155 | 208 | 237 | 375 |

*The urethane-linked polyether contained 5.4% (weight %) dioctyl phthalate to reduce the viscosity.
**Polyether monols made via DMC catalysis.

TABLE V

Filled Sealants From Silmod ® Polyethers

| # | Shore A Hardness | Tensile 100% | Tensile 200% | Tensile 300% | Ultimate | Elongation % |
|---|---|---|---|---|---|---|
| Silmod 20A | 15 | 26 | 70 | 97 | 160 | 590 |
| (literature) | 16 | 19 | | | 123 | 580 |
| Silmod 300 | 33 | 75 | 151 | 194 | 273 | 475 |
| (literature) | 34 | 77 | | | 275 | 556 |
| Silmod ® 20A/ 300 (60/40) | 22 | 47 | 98 | 135 | 215 | 570 |
| (literature) | 22 | 46 | | | 187 | 568 |

(literature) = Values from Union Carbide's Silmod literature (SC-1431A; 1990)
Note:
Silmod polyethers contain about 5% dioctylphthalate.

While the invention has been described above with reference to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for producing a moisture curable silyl-terminated polymer which comprises the steps of:
   (a) reacting a terminally-unsaturated monol with a polyfunctional hydroxyl-reactive compound selected from the group consisting of polyisocyanates and organic polyacyl compounds, in a molar ratio of about one mole of monol for each equivalent of functionality on said polyfunctional hydroxyl-reactive compound, with the proviso that when said polyfunctional hydroxyl-reactive compound is a polyisocyanate and the monol is a polyether monol, then the polyether monol is other than an allyl-started monol, to provide a terminally-unsaturated polymer having terminal unsaturation at each end thereof; and
   (b) reacting said terminally-unsaturated polymer with a dialkoxyalkylsilane to form a dialkoxyalkylsilyl-terminated polymer capable of curing upon contact with moisture.

2. The process of claim 1 wherein said monol is a polyether monol, a polyester monol or a combination of a polyester monol with a polyether monols, with the proviso that if said monol is a polyether monol terminated by a single double bond, then said polyether monol is made utilizing an initiator selected from the class represented by the following empirical structural formula:

$$CH_2=CHCH_2(CRR')_nOH$$

wherein n is a number greater than or equal to 1, and R and R' are selected from the group consisting of hydrogen, alkyl, aryl, cycloalkyl, and aralkyl moieties, and combinations thereof.

3. The process of claim 1 wherein said monol has a molecular weight of between about 400 and about 30,000 and is prepared using a double metal cyanide complex catalyst.

4. The process of claim 1 wherein said dialkoxyalkylsilane is selected from the group consisting of diethoxymethylsilane, dimethoxymethylsilane, and combinations thereof.

5. The process of claim 1 wherein said polyfunctional hydroxyl-reactive compound is a polyacyl compound.

6. A silyl-terminated polymer selected from the group consisting of polyethers or polyesters and combinations thereof, bound together by a polyfunctional hydroxyl-reactive compound selected from the group consisting of polyisocyanates and organic polyacyl compounds, said polymer being made by reacting a monol with said polyfunctional hydroxyl-reactive compound in a molar ratio of about one mole of monol for each equivalent of functionality on said polyfunctional hydroxyl-reactive compound, with the proviso that when said polyfunctional hydroxyl-reactive compound is a polyisocyanate and the monol is a polyether monol, then the polyether monol is other than an allyl-started monol.

7. The polymer of claim 6 wherein said monol has a molecular weight of between about 400 and about 30,000 and is prepared using a double metal cyanide complex catalyst.

8. The polymer of claim 6 wherein the silyl-termination is provided by a compound selected from the group consisting of diethoxymethylsilane, dimethoxymethylsilane, and combinations thereof.

9. The polymer of claim 6 wherein said polyfunctional hydroxyl-reactive compound is a polyisocyanate selected from the group consisting of TDI, MDI, and combinations thereof, employed in a slight molar excess relative to the amount of said monol employed.

10. A filled polymer comprising a filler and a silyl-terminated polymer selected from the group consisting of polyethers or polyesters and combinations thereof, bound together by a polyfunctional hydroxyl-reactive compound selected from the group consisting of polyisocyanates and organic polyacyl compounds, said polymer being made by reacting a monol with said polyfunctional hydroxyl-reactive compound in a molar ratio of about one mole of monol for each equivalent of functionality on said polyfunctional hydroxyl-reactive compound, with the proviso that when said polyfunctional hydroxyl-reactive compound is a polyisocyanate and the monol is a polyether monol, then the polyether monol is other than an allyl-started monol.

11. The filled polymer of claim 10 wherein said monol has a molecular weight of between about 400 and about 30,000 and is prepared using a double metal cyanide complex catalyst.

12. The filled polymer of claim 10 wherein the silyl-termination is provided by a compound selected from the group consisting of diethoxymethylsilane, dimethoxymethylsilane, and combinations thereof.

13. The filled polymer of claim 10 wherein said polyfunctional hydroxyl-reactive compound is a polyisocyanate selected from the group consisting of TDI, MDI, and combinations thereof, employed in a slight molar excess relative to the amount of said monol employed.

14. The filled polymer of claim 10 wherein said filler is selected from the group consisting of calcium carbonate, titanium dioxide, and combinations thereof.

15. A cured rubbery polymer product made by a process comprising contacting moisture with a silyl-terminated polymer selected from the group consisting of polyethers or polyesters and combinations thereof, bound together by a polyfunctional hydroxyl-reactive compound selected from the group consisting of polyisocyanates and organic polyacyl compounds, said polymer being made by reacting a monol with said polyfunctional hydroxyl-reactive compound in a molar ratio of about one mole of monol for each equivalent of functionality on said polyfunctional hydroxyl-reactive compound, with the proviso that when said polyfunctional hydroxyl-reactive compound is a polyisocyanate and the monol is a polyether monol, then the polyether monol is other than an allyl-started monol.

16. The cured rubbery polymer product of claim 15 wherein said monol has a molecular weight of between about 400 and about 30,000 and is prepared using a double metal cyanide complex catalyst.

17. The cured rubbery polymer product of claim 15 wherein the silyl-termination is provided by a compound selected from the group consisting of diethoxymethylsilane, dimethoxymethylsilane, and combinations thereof.

18. The cured rubbery polymer product of claim 15 wherein said polyfunctional hydroxyl-reactive compound is a polyisocyanate selected from the group consisting of TDI, MDI, and combinations thereof, employed in a slight molar excess relative to the amount of said monol employed.

19. A terminally-unsaturated polymer having terminal unsaturation at each end thereof wherein said polymer is produced by a process of reacting a terminally-unsaturated monol with a polyfunctional hydroxyl-reactive compound selected from the group consisting of polyisocyanates and organic polyacyl compounds in a molar ratio of about one mole of monol for each equivalent of functionality on said polyfunctional hydroxyl-reactive moiety, with the proviso that when said polyfunctional hydroxyl-reactive compound is a polyisocyanate and the monol is a polyether monol, then the polyether monol is other than an allyl-started monol.

20. The polymer of claim 19 wherein said monol is selected from the group consisting of polyether monols, polyester monols, and combinations thereof, and wherein said monol has a molecular weight of between about 400 and about 30,000 and is prepared using a double metal cyanide complex catalyst.

21. A cured rubbery polymer product made by a process comprising contacting a polyamine or polyalcohol, or combination thereof, with a silyl-terminated polymer selected from the group consisting of polyethers or polyesters and combinations thereof, bound together by a polyfunctional hydroxyl-reactive compound selected from the group consisting of polyisocyanates and organic polyacyl compounds, said polymer being made by reacting a monol with said polyfunctional hydroxyl-reactive compound in a molar ratio of about one mole of monol for each equivalent of functionality on said polyfunctional hydroxyl-reactive compound, with the proviso that when said polyfunctional hydroxyl-reactive compound is a polyisocyanate and the monol is a polyether monol, then the polyether monol is other than an allyl-started monol.

22. The cured rubbery polymer product of claim 21 wherein said monol has a molecular weight of between about 400 and about 30,000 and is prepared using a double metal cyanide complex catalyst.

23. The cured rubbery polymer product of claim 21 wherein the silyl-termination is provided by a compound selected from the group consisting of diethoxymethylsilane, dimethoxymethylsilane, and combinations thereof.

24. The cured rubbery polymer product of claim 21 wherein said polyfunctional hydroxyl-reactive compound is a polyisocyanate selected from the group consisting of TDI, MDI, and combinations thereof, employed in a slight molar excess relative to the amount of said monol employed.

25. The process of claim 1 wherein said monol is a polyether monol terminated by at least two double bonds.

* * * * *